United States Patent Office 3,748,232
Patented July 24, 1973

3,748,232
PROCESS FOR PREPARING 5-AMINO-4-IMIDAZOLE CARBOXAMIDE RIBOSIDE
Yuichi Noguchi, Kazumi Araki, and Naonori Aoki, Hofu-shi, Japan, assignors to Kyowa Hakko Kogyo Co., Ltd., Tokyo, Japan
No Drawing. Continuation of application Ser. No. 677,866, Oct. 25, 1967. This application June 17, 1968, Ser. No. 737,374
Claims priority, application Japan, Oct. 28, 1966, 41/70,719
Int. Cl. C12d *13/06*
U.S. Cl. 195—28 N                    9 Claims

ABSTRACT OF THE DISCLOSURE

A process for the preparation of 5-amino-4-imidazole carboxamide riboside by fermentation which comprises culturing certain strains of microorganism belonging to the genus Brevibacterium in an aqueous nutrient medium under aerobic conditions and accumulating and recovering the 5-amino-4-imidazole carboxamide riboside from the resultant fermentation liquor. Particularly advantageous strains which may be employed are *Brevibacterium ammoniagenes* ATCC 21105 and 21106.

CROSS-REFERENCE TO RELATED APPLICATION

This application is a continuation application of copending application of U.S. Ser. No. 677,866, filed on Oct. 25, 1967, and now abandoned.

This invention relates to a process for the preparation of 5-amino-4-imidazole carboxamide riboside. More particularly, it relates to a process for the production of 5-amino-4-imidazole carboxamide riboside by fermentation. Even more particularly, the invention relates to a process for preparing 5-amino-4-imidazole carboxamide riboside by fermentation with microorganisms belonging to the genus Brevibacterium.

5-amino-4-imidazole carboxamide riboside (abbreviated as AICAR hereinbelow) has been produced in the prior art by the dephosphorylation of 5-amino-4-imidazole carboxamide ribotide. AICAR is a precursor in the biosynthesis of purine nucleotides, which are constituent members of nucleic acids important in the living body. AICAR is also a compound which can be used for producing inosinic acid, the latter being important in its use as a medicine and as a seasoning. It is thus quite evident that 5-amino-4-imidazole carboxamide riboside is a useful compound.

One of the objects of the present invention is to provide an improved process for the production of 5-amino-4-imidazole carboxamide riboside which overcomes the disadvantages and deficiencies of the prior art methods.

Another object of the present invention is to provide a process for the preparation of 5-amino-4-imidazole carboxamide riboside by fermentation which may be carried ou in an efficacious and simple manner.

A further object of the invention is to provide a process for preparing 5-amino-4-imidazole carboxamide riboside by fermentation which may be carried out advantageously on an industrial scale at low cost to give a high yield of product.

These and other objects and advantages of the present invention will become apparent to those skilled in the art from a consideration of the following specification and claims.

In accordance with the present invention, it has been found that remarkably large amounts of 5-amino-4-imidazole carboxamide riboside can be produced by culturing certain mutant strains of microorganisms belonging to the genus Brevibacterium in an aqueous nutrient medium under aerobic conditions. Specifically, the present inventors have found that *Brevibacterium ammoniagenes* No. 1011 ATCC 21106 and *Brevibacterium ammoniagenes* No. 1014 ATCC 21105 have the capacity of accumulating large amounts of 5-amino-4-imidazole carboxamide riboside in a culturing solution.

*Brevibacterium ammoniagenes* ATCC 21106 and ATCC 21105 were produced by the ultraviolet radiation of parent strain *Brevibacterium ammoniagenes* ATCC 6871. *Brevibacterium ammoniagenes* ATCC 21106 is a purine-requiring mutant strain. *Brevibacterium ammoniagenes* ATCC 21105 is a so-called purine "leaky" mutant, which means that the growth and proliferation of its bacterial cells are accelerated by the addition of purine to the culture medium although purine is not indispensably required as a nutrient for its growth and proliferation. The general bacteriological properties of *Brevibacterium ammoniagenes* are described in Bergey's "Manual of Determinative Bacteriology," seventh edition (1957). The above-mentioned mutant strains, obtained by ultraviolet irradiation, differ from the parent strain as described above and in their capacity to accumulate remarkably large amounts of AICAR in a culture medium in which they are cultivated.

Up to now, it has been known that certain strains of the genus Bacillus, such as *Bacillus subtilis* (Japanese patent publication 24,513/1965) and *Bacillus megaterium* (Japanese patent publication 13,793/1966), as well as specific strains of microorganisms belonging to the genus Escherichia have the capability of producing AICAR by fermentation. It has not, however, been known that any microorganisms belonging to the genus Brevibacterium could accumulate AICAR in a fermentation process. This latter point is the novel finding made by the present inventors and forms the basis of the present application.

Either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts.

Thus, as a carbon source, there may be mentioned, by way of example, carbohydrates such as glucose, fructose, maltose, starch, saccharified starch solutions, mannose, galactose, etc., or any other suitable carbon source such as glycerol, mannitol, sorbitol, organic acids, etc. These substances may be used either singly or in mixtures of two or more.

As a nitrogen source, various kinds of inorganic or organic salts or compounds, such as urea or ammonia or ammonium salts such as ammonium chloride, ammonium sulfate, ammonium nitrate, ammonium phosphate, ammonium acetate, ammonium citrate, etc., or natural substances containing nitrogen, such as cornsteep liquor, yeast extract, meat extract, peptone, fish meal, bouillon, casein hydrolysates, yeast hydrolysates, fish solubles, etc. may be employed. These substances may also be used either singly or in combinations of two or more.

Inorganic compounds which may be added to the culture medium include metal salts of iron, manganese, magnesium, cobalt, zinc, nickel, chromium and the like, for example, magnesium sulfate, iron sulfate, manganese chloride, calcium chloride, etc., or phosphate compounds such as sodium phosphate, potassium dihydrogen phosphate, potassium monohydrogen phosphate, etc.

Moreover, depending upon the particular nutrient requirements of the microorganism employed in the fermentation, it is necessary to add nutrients corresponding to these requisites to the culture medium. Examples of such nutrients include purine bases such as adenine, guanine, hypoxanthine, xanthine, etc. as well as nucleosides and nucleotides thereof. These nutrients are contained in the natural substances containing nitrogen above mentioned, such as yeast extract, meat extract, fish meal, bouillon, yeast hydrolysates, fish solubles and cornsteep liquor, therefore when such natural nutrients are added to the nutrient medium, a part or all of the nutrients can be substituted by such natural nutrients.

Culturing of the Brevibacterium strains in accordance with the present invention is conducted under aerobic conditions, such as aerobic shaking of the culture or with stirring of a submerged culture, at a temperature of about 25° to 40° C., preferably 27°–37° C., and at a pH of about 5.5 to 8.5. There is a tendency for the pH to be lowered during culturing, but the adjustment of the pH to the said range at the initiation of culturing or during the culturing period by using suitable neutralizing agents will enable high yields of AICAR to be obtained. As neutralizing agents, alkaline solutions such as aqueous ammonia, sodium hydroxide, potassium hydroxide, ammonium carbonate, calcium carbonate and calcium hydroxide, and urea may be used.

After about 3 to 6 days of culturing under these conditions, large amounts of AICAR are found to be accumulated in the culture medium. This product may be separated from the fermentation liquor by conventional means, such as ion exchange resin treatment, precipitation, adsorption, chromatography and the like. Advantageously, the AICAR is obtained by forming the barium salt thereof. Adsorption with active carbon and ion exchange resin treatment of the culture solution freed of bacterial cells can be used to obtain a purified AICAR-containing solution. This solution can then be concentrated to dryness after neutralization with barium hydroxide.

The following examples are given merely as illustrative of the present invention and are not to be considered as limiting. Unless otherwise noted, the percentages therein and throughout the application are by weight.

EXAMPLE 1

*Brevibacterium ammoniagenes* No. 1014 ATTC 21105 is employed as the seed culture. It is cultivated in a culture medium consisting of 1 g./dl. of peptone, 1 g./dl. of bouillon, 0.5 g./dl. of yeast extract and 0.3 g./dl. of saline water at a pH of 7.0 for 24 hours.

A fermentation medium having the following composition (per liter of water) is prepared:

|  | G./dl. |
|---|---|
| Glucose | 10 |
| Ammonium chloride | 1.7 |
| $KH_2PO_4$ | 0.15 |
| $K_2HPO_4$ | 0.05 |
| $MgSO_4 \cdot 7H_2O$ | 0.6 |
| $FeSO_4 \cdot 7H_2O$ | 0.002 |
| $MnSO_4 \cdot 4H_2O$ | 0.002 |
| Yeast extract | 0.7 |
| $CaCO_3$ | 3 |
| Biotin—25 µg./l. | |

Twenty ml. portions of the above fermentation medium are poured into Sakaguchi flasks having a capacity of 500 ml. Then, 1 ml. of the above described seed culture is inoculated into each of the flasks after sterilization.

Culturing is then carried out with aerobic shaking of the cultures in the flasks at 32° C. for four days. After the completion of fermentation or culturing, 10.3 mg./ml., on the average, of 5-amino-4-imidazole carboxamide riboside is found to be accumulated in the culture medium in each flask.

The fermentation liquors in the flasks are combined and brought to a volume of 1 liter. The bacterial cells are removed therefrom and 150 grams of active carbon is added thereto. The AICAR is adsorbed on the active carbon after 2 hours of stirring at room temperature. The active carbon is separated by filtration. The AICAR is eluted by the addition of 400 ml. of 50% (by volume) ethanol containing 8 ml. of 28% (by volume) aqueous ammonia with stirring at room temperature for 24 hours. The effluent is then filtered. This filtrate is concentrated to 40 ml. at 50°–60° C. under reduced pressure. The resultant solution is then passed through a column packed with a strongly basic anion exchange resin of the chloride type (Dowex 1X8, a product of the Dow Chemical Company) to adsorb the AICAR. After washing with water, the AICAR is then eluted with 0.005 N hydrochloric acid. By combining the various AICAR fractions, adjusting to a pH of 7.0 with barium hydroxide and concentrating to dryness at 50°–60° C., 11.4 grams of the barium salt of 5-amino-4-imidazole carboxamide riboside is obtained.

The obtained product is found to be identical with a standard sample as a result of investigations on its behavior with respect to $R_f$ value by paper chromatographic observation, its ultraviolet absorption spectrum and its reaction with diazotized sulfanilic acid and orcinol reaction observed with a substance obtained by the recrystallization of the recovered AICAR barium salt.

EXAMPLE 2

A fermentation medium having the following composition is poured into Sakaguchi flasks having a capacity of 500 ml., 20 ml. to each:

|  | G./dl. |
|---|---|
| Glucose | 10 |
| Ammonium sulfate | 2.0 |
| $KH_2PO_4$ | 15 |
| $K_2HPO_4$ | 0.05 |
| $MgSO_4 \cdot 7H_2O$ | 0.6 |
| $FeSO_4 \cdot 7H_2O$ | 0.002 |
| $MnSO_4 \cdot 4H_2O$ | 0.002 |
| $CaCO_3$ | 2.0 |
| Adenine—30 µg./l. | |

After sterilization, 1 ml. of a seed culture of *Brevibacterium ammoniagenes* No. 1011 ATTC 21106 is inoculated into each flask. Culturing is then carried out with aerobic shaking for four days at 33° C. As a result, 8.7 mg./ml. of AICAR on the average is found to be accumulated in the culture liquor in each flask.

The fermentation liquors in each flask are then combined and brought to a volume of 1 liter with distilled water. Treatment thereof is then carried out in exactly the same manner as described in Example 1. As a result, 9.8 grams of the barium salt of 5-amino-4-imidazole carboxamide riboside is obtained.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:
1. A process for the preparation of 5-amino-4-imidazole carboxamide riboside by fermentation which comprises culturing a microorganism capable of producing 5-amino-4-imidazole carboxamide riboside and belonging to *Brevibacterium ammoniagenes* in an aqueous nutrient medium under aerobic conditions, and accumulating and recovering the 5-amino-4-imidazole carboxamide riboside from the resultant fermentation liquor.

2. The process of claim 1, wherein said microorganism is *Brevibacterium ammoniagenes* No. 1014 ATCC 21105.

3. The process of claim 1, wherein said microorganism is *Brevibacterium ammoniagenes* No. 1011 ATCC 21106.

4. The process of claim 1, wherein culturing is carried out at a temperature of from about 25° to 40° C. and at a pH of about 5.5 to 8.5.

5. The process of claim 1, wherein said nutrient medium contains a purine.

6. A process for the preparation of 5-amino-4-imidazole carboxamide riboside by fermentation which comprises culturing a microorganism selected from the group consisting of *Brevibacterium ammoniagenes* ATCC 21105 and *Brevibacterium ammoniagenes* ATCC 21106 in an aqueous nutrient medium under aerobic conditions at a temperature of from about 25° to 40° C. and at a pH of about 5.5 to 8.5 and accumulating and recovering the 5-amino-4-imidazole carboxamide riboside from the resultant fermentation liquor.

7. The process of claim 6, wherein said nutrient medium contains a purine.

8. The process of claim 6, wherein the 5-amino-4-imidazole carboxamide riboside product is recovered from the fermentation liquor by adsorption.

9. The process of claim 8, wherein said adsorption step is followed by an ion exchange resin treatment to obtain pure 5-amino-4-imidazole carboxamide riboside.

References Cited
UNITED STATES PATENTS
3,173,848   3/1965   De Zeeuw _____ 195—28 N ALVIN E. TANENHOLTZ, Primary Examiner